United States Patent
Ernisse

[15] 3,696,723
[45] Oct. 10, 1972

[54] CAMERA WITH METERED FILM ADVANCE AND DOUBLE EXPOSURE PREVENTION

[72] Inventor: Paul J. Ernisse, Rochester, N.Y.
[73] Assignee: Eastman Kodak Company, Rochester, N.Y.
[22] Filed: Feb. 27, 1969
[21] Appl. No.: 802,864

[52] U.S. Cl..............95/31 FM, 95/31 AC, 95/31 FL
[51] Int. Cl........G03b 1/62, G03b 9/68, G03b 17/42
[58] Field of Search......................95/31, 31 X, 31 FL

[56] References Cited

UNITED STATES PATENTS

| | | | |
|---|---|---|---|
| 3,406,621 | 10/1968 | Irwin | 95/31 |
| 2,847,920 | 8/1958 | Polhemus | 95/31 |
| 3,253,526 | 5/1966 | Steisslinger | 95/31 |
| 3,412,665 | 11/1968 | Greger et al. | 95/31 |
| 2,722,872 | 11/1955 | Schrader | 95/31 |
| 3,489,070 | 1/1970 | Fauth | 95/31 AC |
| 3,512,466 | 5/1970 | Fauth et al. | 95/31 FL |
| 3,532,040 | 10/1070 | Ehgartner | 95/31 FM |

*Primary Examiner*—Samuel S. Matthews
*Assistant Examiner*—Russell E. Adams, Jr.
*Attorney*—Robert W. Hampton and J. Addison Mathews

[57] ABSTRACT

A camera adapted for use with film having metering perforations at predetermined intervals therealong, is provided with a film metering mechanism including a metering member having a metering tooth adapted to enter a perforation in the film and to be moved by the advancing film. Movement of the metering tooth moves the metering member to an operative position wherein the metering mechanism blocks further advance of the film. Manual depression of a trigger operating element effects withdrawal of the metering tooth from the film perforation and permits return of the metering member to an inoperative position under spring bias. Return movement of the metering member drives a control member which actuates the camera shutter drive mechanism and locks the trigger operating element in a depressed position. Movement of the metering member to its operative position drives the control member to cock the shutter drive mechanism and unlock the trigger operating element for movement from its depressed position.

6 Claims, 8 Drawing Figures

PATENTED OCT 10 1972
3,696,723
SHEET 1 OF 2
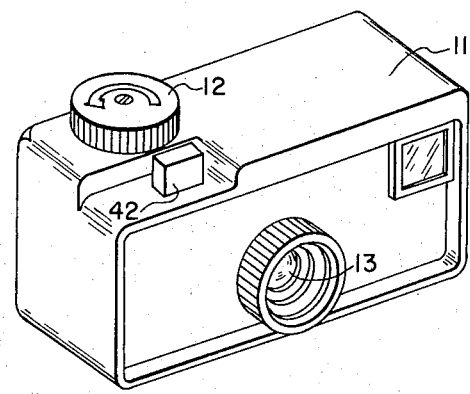
FIG. 1
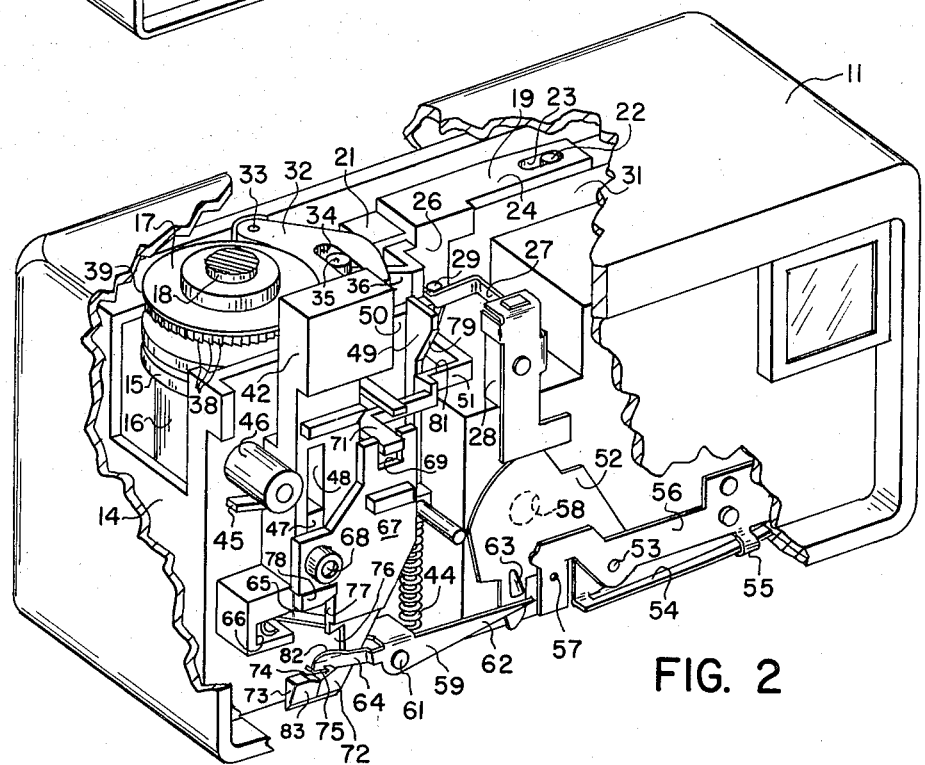
FIG. 2
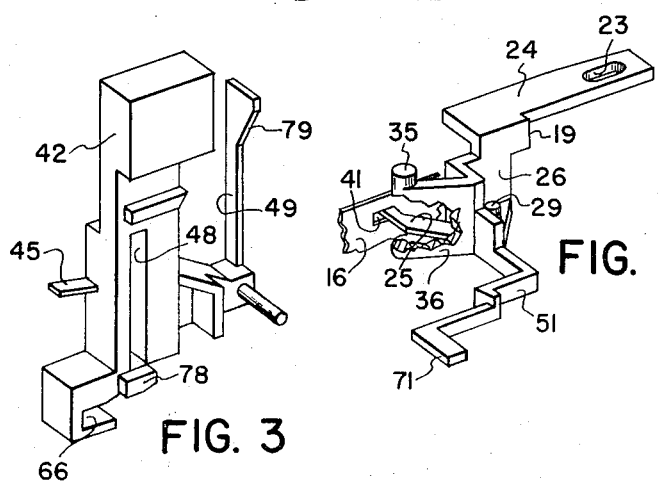
FIG. 3
FIG. 4
PAUL J. ERNISSE
INVENTOR.
BY J. Adding Mathews
Robert W Hampton
ATTORNEYS

PAUL J. ERNISSE
INVENTOR.

BY
ATTORNEYS

CAMERA WITH METERED FILM ADVANCE AND DOUBLE EXPOSURE PREVENTION

BACKGROUND OF THE INVENTION

1. Field of the Invention

The present invention relates to photographic cameras of the type adapted to be loaded with roll film having perforations for metering the advancement of progressive film exposure areas into exposure position.

2. Description of the Prior Art

It is well known to provide a roll film camera with film metering means for arresting the film winding mechanism automatically as each successive film exposure area is moved into exposure position in alignment with the camera lens. One means for accomplishing such film metering is incorporated in the pre-loaded film magazine disclosed in U.S. Pat. No. 3,138,081 filed in the name of H. Nerwin and issued June 23, 1964. In such film magazines, which are particularly appropriate for use in cameras according to the present invention, the film is provided with a metering perforation adjacent each film exposure area. When the magazine is loaded into a camera adapted to receive the same, a metering member tooth engages the edge of the film in alignment with the metering perforations. Each time the tooth enters a metering perforation, the metering member is thereby displaced to a position at which it causes the winding mechanism to be arrested until the tooth subsequently is withdrawn and returned to its former position in response to the next operation of the camera shutter.

To avoid the possibility of double exposures, it is also well known to provide such a camera with means for preventing a second operation of the camera shutter until the subsequent film advancing operation has been completed. In many cameras, this is accomplished by means of a trigger blocking member which allows the shutter trigger to be depressed only once and then prevents it from being depressed again until the blocking member has been disabled by the metering mechanism upon completion of the next film advancing operation. Alternatively, in a camera of the type contemplated by the present invention, the trigger member is releasably latched in its depressed position after it has effected actuation of the camera shutter and is allowed to return to its initial position only after the film has been advanced. Even though other means may prevent the shutter in the latter type of camera from being operated again by a second depression of the trigger before the film has been advanced, this feature is nevertheless very advantageous inasmuch as it provides the photographer with both a visual and tactile indication that the camera is not in operable condition before he attempts to depress the trigger.

As mentioned above, the proper performance of the film metering mechanism requires the tooth of the metering member to be withdrawn from a perforation in the film following each operation of the camera shutter in order that the metering member can then return to its initial position at which its tooth can enter the next film perforation. In a camera of the type in which the trigger is allowed to return to its initial position and is then blocked against being depressed a second time, such withdrawal of the tooth from the film perforation is generally accomplished in response to the return movement of the trigger after the shutter has been operated. Since the type of camera mechanism contemplated by the present invention retains the trigger in its depressed position until after the subsequent advancement of the film has been completed, however, it is apparent that other means must be employed to retract the tooth of the metering member from the film perforation in which it is received. Accordingly, one previously known arrangement for performing that function in such cameras derives power from the movement of the shutter blade or an element closely associated therewith to effect withdrawal of the metering tooth. Such an arrangement, though, inherently requires the use of a shutter mechanism much heavier and more structurally rugged than otherwise would be necessary, and also is very likely to detract from smooth and properly timed operation of the shutter. Alternatively, it is also known to provide such cameras with means for effecting both the actuation of the camera shutter and also the withdrawal of the metering tooth from the film perforation in direct response to depression of the trigger member. In order that any slight camera vibration resulting from the sudden movement of the metering member back to its initial position will not coincide with the opening of the shutter, it is preferable that those two functions are performed in response to progressive depression of the trigger member to two different positions. However, regardless of which function occurs first, the accompanying audible click of the camera mechanism may lead the operator to discontinue depressing the trigger before the other function has taken place, thereby causing the camera mechanism to malfunction. Although the occurrence just described will be avoided if the operator remembers to depress the trigger through its full range of movement, the susceptibility of the mechanism to such possible malfunctioning is obviously disadvantageous.

SUMMARY OF THE INVENTION

The present invention incorporates a simple and reliable camera mechanism of the general type mentioned above in which the shutter trigger remains depressed after each exposure until the next film advancing operation is completed. In accordance with the invention, however, manual depression of the trigger withdraws the metering tooth from engagement with the film but does not directly produce operation of the camera shutter. Instead, the shutter is actuated in response to the resulting spring powered movement of the metering mechanism back to its initial position. Additionally, the latching device employed to retain the trigger member temporarily in its depressed position is also moved into operative engagement with the trigger member in response to the same movement of the metering member. Accordingly, properly coordinated operation of both the shutter and the film metering mechanism requires only that the trigger be manually depressed sufficiently to effect withdrawal of the metering tooth from the corresponding metering perforation, but is entirely independent of subsequent trigger movement. Notwithstanding its simplicity and reliability, the mechanism provided by the present invention is comparatively inexpensive due to the fact that a majority of its operative components are devoid of highly critical dimensional tolerances and are well adapted to being made of molded plastic materials.

Various means for practicing the invention and other advantages and novel features thereof will be apparent from the following detailed description of an illustrative preferred embodiment of the invention, reference being made to the accompanying drawings in which like reference characters denote like elements.

BRIEF DESCRIPTION OF THE DRAWINGS

In the accompanying drawings:

FIG. 1 is a perspective view of a camera adapted to incorporate an internal mechanism constructed in accordance with the present invention;

FIG. 2 is a perspective view of a camera of the type shown in FIG. 1, with portions thereof broken away to depict the internal camera mechanism comprising a preferred embodiment of the invention, such mechanism being illustrated with its operative components in the respective positions which they assume after completion of a film winding operation but before the trigger member has been depressed to effect the next film exposure;

FIG. 3 is a perspective view of the trigger member of the camera mechanism shown in FIG. 2;

FIG. 4 is a perspective view of the metering member of the camera mechanism shown in FIG. 2, showing that member partially broken away to illustrate its metering tooth received in a metering perforation of a depicted portion of the camera film;

DESCRIPTION OF THE ILLUSTRATIVE PREFERRED EMBODIMENT

Figure 5:
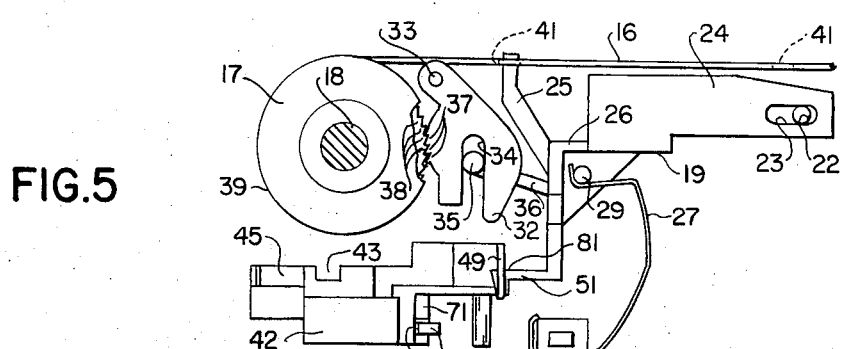
FIG. 5 is a somewhat schematic plan view of various operative components of the subject mechanism in their respective positions illustrated FIG. 2.

Referring to FIG. 1 of the drawings, the illustrative camera is a typical inexpensive camera comprising a housing 11 provided with a rotatable film winding knob 12 and with an objective lens 13. Preferably, the camera is adapted to be loaded with a film magazine of the type disclosed in the previously identified U.S. Pat. No. 3,128,081.

As shown in FIG. 2 of the drawings, an internal frame member 14, preferably made of molded plastic material, is enclosed within housing 11. In a manner similar to that disclosed in the aforementioned U.S. Patent, the frame member is adapted to support a film magazine in fixed relation thereto so that successive film exposure areas can be advanced into a predetermined focal plane of the objective lens. For purposes of clarity, the housing of the film magazine has been omitted in the accompanying drawings, in which such a magazine is represented only by its film take-up spool 15 and by a portion of its elongate strip of film shown at 16.

The film take-up spool of the film magazine is rotatably coupled to film winding member 17 by means of a driving key, not shown, which is movable out of engagement with the spool by a mechanism of the general type disclosed in U.S. Pat. No. Re. 26,181 to facilitate loading and unloading the camera. The winding member, in turn, is supported by its central shaft 18 which extends through the top wall of the camera housing and is connected to winding knob 12. A ratchet mechanism, not shown, is provided within the winding knob to allow it to be rotated only in a counterclockwise direction, whereby the resulting counterclockwise rotation of the take-up spool advances successive film exposure areas into exposure position as the film winds onto the spool.

Metering member 19, which is shown removed from the camera in FIG. 4, is also preferably made of molded plastic and is supported by horizontal rail 21 of frame member 14. A stationary pin 22 extends upwardly from horizontal frame member rail 21 into an elongate slot 23 in the horizontal upper limb 24 of the metering member. This pin maintains the member in supported cooperation with rail 21 but allows it to slide to the right or left along that rail and to be rotated slightly in a counterclockwise direction from the position depicted in FIGS. 2 and 5. It will be understood that directional and positional terms such as right, left, forward, etc. are used throughout the present disclosure in conformity with the manner in which the camera mechanism is depicted in the accompanying drawings.

Metering tooth 25 is supported by vertical leg 26 of the metering member and extends rearwardly through a slot in the frame member aligned with the perforated upper edge of the film strip. A leaf spring 27 is supported by frame member post 28 with its free end in engagement with metering member pin 29. This spring tends to slide the metering member to the right and also biases it in a clockwise direction about pin 22 to maintain its vertical leg 26 in resilient contact with the adjacent vertical surface 31 of horizontal frame member rail 21.

Figure 6:
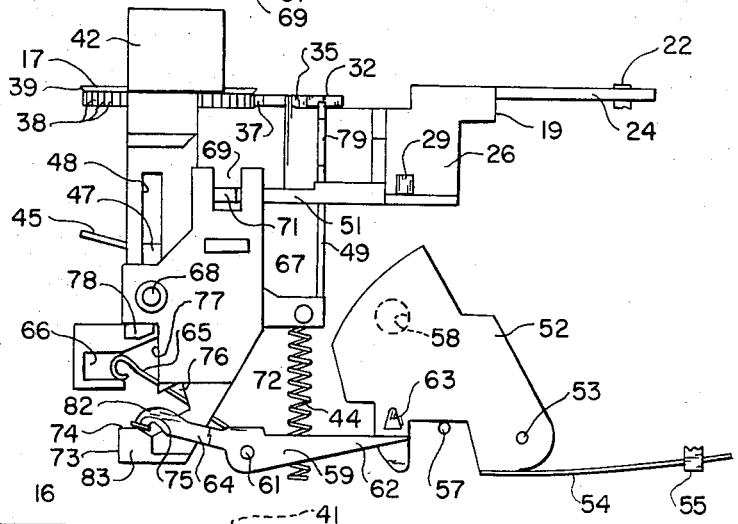
Fig. 6 is a front elevational view corresponding generally to Fig. 5.
Figure 7:
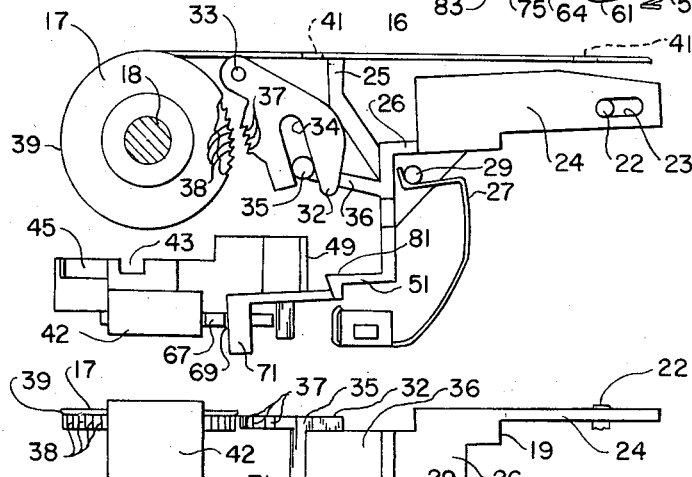
FIG. 7 corresponds to FIG. 5 but depicts the illustrated components of the subject mechanism in the respective positions which they assume after the camera shutter has been operated but before the subsequent film winding operation has been commenced.
Figure 8:
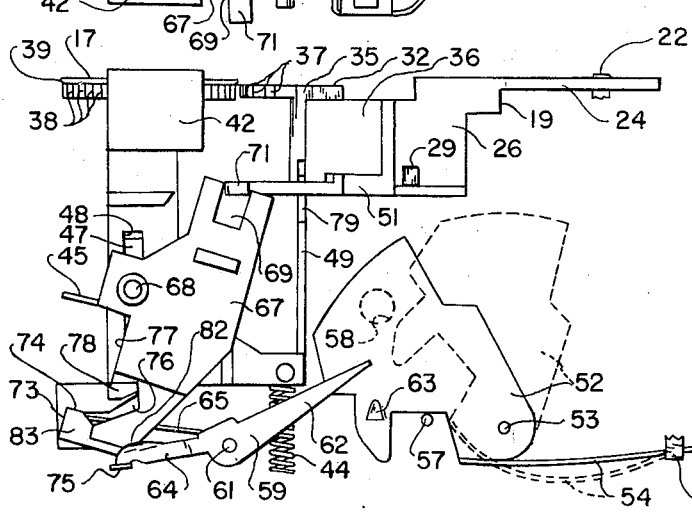
FIG. 8 is a front elevational view corresponding generally to FIG. 7.

Pawl member 32 is supported to the frame member by pin 33 and is provided with a slot 34 adapted to receive a cylindrical stud 35 projecting upwardly from arm 36 of the metering member. A plurality of sloped pawl teeth 37 along one edge of the pawl member are aligned with oppositely sloped teeth 38 encircling the film winding member below circular rim 39. Whenever the metering member is moved to the left as shown in FIGS. 2, 5, and 6, the engagement of pawl member teeth 37 with the winding member teeth 38 blocks rotation of the winding knob and thereby arrests advancement of the film. Upon movement of the metering member to the right, however, the pawl member is disengaged from the winding member as shown in FIGS. 7 and 8 so that the latter is rotatable by the winding knob. As explained later in greater detail, each operation of the camera shutter is preceeded by movement of the metering member to the position shown in FIGS. 7 and 8, in which spring 27 urges the tip of the metering tooth against the surface of the camera film in horizontal alignment with metering perforations 41 therein. As the advancement of the film brings the next metering perforation into alignment with the tooth, it enters that perforation, as shown in FIGS. 4 and 5, whereupon the subsequent movement of the film pulls the metering member to the left until the winding member is again blocked to complete that film advancing operation.

Trigger member 42 is supported for vertical sliding movement by a vertical frame member rail, not shown, which is received in a slot in the trigger member, shown at 43 in FIGS. 5 and 7. A compression spring 44 urges the trigger member to its raised position shown in FIGS. 2, 6 and 8, which is defined by the abutment of stop leg 45 with cylindrical frame member boss 46. Guide key 47, projecting forwardly from the vertical frame member rail, is accommodated in slot 48 in the trigger member and is adapted to engage the upper end of that slot to define the lowermost position to which the trigger member can be depressed. As identified by numeral 49, the trigger member also includes a vertical cam finger located in contact with vertical frame surface 50 behind control arm 51 of the metering member.

The camera shutter comprises a one-piece shutter blade member 52 formed of thin resilient sheet metal and pivoted to the frame member by stud 53. A leaf spring 54 is formed integrally with the shutter blade and is engaged by ear 55 of shutter guide plate 56. This spring biases the shutter blade in a counterclockwise direction toward its illustrated closed position at which the blade abuts against stop pin 57 and covers an exposure aperture in the frame member shown in broken lines at numeral 58. Shutter drive lever 59, also formed of resilient sheet metal, is pivotally mounted on pin 61 and includes a pointed arm 62 located closely adjacent the front surface of the shutter blade below sloped drive lug 63 projecting forwardly from that surface. Opposite arm 62, the shutter drive lever is provided with a latch arm 64 and with a normally straight spring blade 65, the cylindrically bent free end of the latter being received in notch 66 in the trigger member.

A molded plastic control plate 67 is pivotally supported adjacent the trigger member by a cylindrical stud 68 projecting forwardly from frame member guide key 47. At its upper end, the control plate is provided with a notch 69 which receives tongue 71 extending forwardly from control arm 51 of the metering member to correlate the angular position of the control plate with the position of the metering member. Shutter latching arm 72 extends downwardly from the control plate between latch arm 64 and spring blade 65 of the shutter drive lever and is provided with a latching boss 73, the upper surface 74 of which is located below abutment ear 75 of latch arm 64 when the control plate is in its vertical position shown in FIGS. 2 and 6. The shutter latching arm also includes a trigger blocking notch 76 located below vertical edge surface 77, which is laterally adjacent blocking lug 78 of the trigger member whenever that member and the control blade are positioned as shown in those same two Figs. of the drawings.

As the operator manually depresses the trigger member against the opposition of compression spring 44, the free end of spring blade 65 is also depressed, thereby applying counterclockwise torque to the shutter drive lever. The drive lever is unable to rotate in a counterclockwise direction, however, due to the engagement of abutment ear 75 with the upper surface 74 of latching boss 73. Consequently, spring blade 65 is resiliently stressed and exerts increasing counterclockwise torque on the drive shutter lever. During such downward movement of the trigger member, the corresponding downward movement of cam finger 49 brings sloped cam face 79 thereof into contact with the left end of shoulder 81 of control arm 51, whereby the metering member is rotated slightly in a counterclockwise direction to withdraw the pawl tooth gradually from the film perforation in which it is received. When the trigger member has moved downwardly to a position at which blocking lug 78 thereof is in horizontal alignment with trigger blocking notch 76 in the control plate, the withdrawal of the pawl tooth from the film perforation is completed, thereby allowing the metering member to be driven to the right by leaf spring 27. Consequently, shoulder 81 moves out of engagement with the cam face of the cam finger and allows the tip of the metering tooth to engage and slide along the surface of the film adjacent the perforation from which the tooth was just withdrawn. As previously explained, this movement of the metering member to the right also disengages pawl member 32 from winding member 17 so that the film can again be advanced.

Concurrently, the corresponding movement of tongue 71 to the right rotates the control plate in a clockwise direction so that trigger blocking notch 76 receives blocking lug 78 of the trigger member as latching boss 73 moves out of alignment with abutment ear 75 at the end of the latch arm of the trigger drive lever. When the latching boss is disengaged from the trigger drive lever, the latter is driven rapidly in a counterclockwise direction by the energy stored in spring blade 65. Accordingly, the pointed arm 62 of the trigger member engages drive lug 63 of the shutter blade and drives the latter rapidly in a clockwise direction. Due to its inertia, the shutter blade continues to move in a clockwise direction beyond aperture 58 to the position shown in broken lines in FIG. 8 after the end of drive lever arm 62 disengages drive lug 63. Inasmuch as the metering member has almost completed its movement back to its initial position before the shutter drive lever is released by the control plate, it will be apparent that the finite time required for the shutter blade to be driven beyond the exposure aperture insures that the resulting exposure is delayed momentarily until after the metering member and the control plate have come to rest, regardless of the speed with which the trigger member is depressed. As soon as the inertia of the shutter blade is overcome by leaf spring 54, that spring rapidly returns the blade to its initial position to terminate the exposure. During this return movement of the blade, the shutter drive lever remains in the position shown in FIG. 8 with the end of its arm 62 located beyond the arcuate path of movement of drive lug 63. Having completed the exposure, the operator now releases the trigger member. Due to the reception of blocking lug 78 in trigger blocking notch 76 of the control plate, however, all of the illustrated components are retained temporarily in their respective positions shown in FIG. 8.

As the film is subsequently advanced in response to manual rotation of the winding knob, the metering member is pulled to the left by the film, as previously explained. During such movement, the left edge of control arm shoulder 81 engages the right edge of the cam finger adjacent cam surface 79. Because of the flexibility of the cam finger, however, it is simply flexed temporarily to the left as the metering member continues to move to the position shown in FIGS. 2 and 5 to block further advancement of the film. Concurrently, tongue 71 rotates control plate 67 in a counterclockwise direction, thus moving trigger blocking notch 76 beyond blocking lug 78 of the trigger member; whereupon spring 44 returns the trigger member to its raised position. When such upward movement of the trigger member commences, latching boss 73 of the control plate latching arm 72 is above the corresponding end of latch arm 64 of the shutter drive lever, which is still positioned as shown in FIG. 8. As the trigger member continues to move upwardly, however, the free end of spring blade 65 is raised by notch 66 and pivots the shutter drive lever back to its initial position by camming the slanted upper edge 82 of latch arm 64 past the sloped forward face 83 of latching boss 73 and by similarly camming the tip of drive lever arm 62 past the sloped forward face of the sloped drive lug 63. Simultaneously, the upward movement of cam finger 49 moves the sloped cam face 79 thereof upwardly beyond shoulder 81 of control arm 52, allowing the cam finger to reassume its vertical position. Accordingly, upon arrival of the trigger member at its raised position defined by the abutment of stop leg 45 with frame member boss 46, all of the operative components of the mechanism have been restored to their respective positions shown in FIGS. 2, 5 and 6, thus completing the operating cycle.

The invention has been described in detail with particular reference to a preferred embodiment thereof, but it will be understood that variations and modifications can be effected within the spirit and scope of the invention.

I claim:

1. A camera adapted to accommodate an elongated strip of photographic film provided with metering perforations at predetermined intervals therealong, said camera comprising:
   a film advancing device movable to advance the strip of photographic film longitudinally past a predetermined exposure location,
   a metering member including a metering tooth adapted to enter a metering perforation in the film and to move therewith in the direction of film advance under urging of the film to move said metering member from an inoperative position to an operative position,
   means for disabling said film advancing device in response to the presence of said metering member at said operative position,
   means for resiliently urging said metering member toward said inoperative position,
   a trigger member movable manually from a first position to a second position while said metering member is in said operative position to withdraw said metering tooth from the film perforation in which it is received to permit movement of said metering member from said operative position to said inoperative position by said urging means,
   a shutter operable to effect exposure of an area of the strip of photographic film located at said predetermined exposure location,
   means for operating said shutter, and
   means for actuating said shutter operating means in response to movement of said metering member from said operative position toward said inoperative position by said urging means.

2. A camera according to claim 1 including:
   means for biasing said trigger member from said second position toward said first position,
   means releasably engageable with said trigger member upon movement of said trigger member to said second position for releasably retaining said trigger member in said second position in opposition to said biasing means, and
   means for disengaging said trigger retaining means from said trigger member in response to movement of said metering member from said inoperative position to said operative position.

3. In a camera adapted to be loaded with an elongated strip of film provided with metering perforations at predetermined intervals therealong, said camera including:
   a film winding member rotatable to move the strip of film longitudinally past a predetermined exposure location,
   a movable metering member including a metering tooth adapted to enter one of the perforations in the strip of film to translate movement of the strip of film by said winding member into corresponding movement of said metering member from an inoperative position to an operative position,
   means engageable with said metering member for resiliently urging said metering tooth toward the strip of film and for resiliently urging said metering member toward said inoperative position,
   a pawl member engageable with said film winding member in response to movement of said metering member to said operative position to block rotation of said film winding member as long as said metering member is in said operative position,
   a lens,
   a shutter mechanism operable to effect exposure of an area of the strip of film located at said predetermined exposure location in optical alignment with said lens,
   a trigger member manually movable from an extended position to a depressed position, and
   means for resiliently urging said trigger member from said depressed position toward said extended position,
   the improvement comprising:
      means for translating movement of said trigger member from said extended position to said depressed position into withdrawal of said metering tooth from the metering perforation in which it is received in the strip of film, to permit movement of said metering member by said metering member urging means from said operative position to said inoperative position to disengage said pawl member from said winding member, and
      means for operating said shutter mechanism in response to the movement of said metering member by said metering member urging means from said operative toward said inoperative position.

4. A camera according to claim 3 including a control member pivotally movable by said metering member to first and second locations corresponding respectively to said inoperative and operative positions of said metering member, said control member being adapted upon movement to said first location to engage said trigger member in said depressed position and to retain said trigger member in said depressed position in opposition to said trigger member urging means until said control member is disengaged from said trigger member by subsequent movement of said control member to said second location.

5. A camera according to claim 4 in which said shutter operating means includes:
a shutter drive member movable from a first position to a second position to operate said shutter,
means defined by said control member and engageable with said shutter drive member when said control member is at said second location for blocking movement of said shutter drive member from said first position to said second position, said blocking means being disengaged from said shutter drive member upon movement of said control member to said first location, and
means for resiliently biasing said shutter drive member toward said second position in response to movement of said trigger member from said extended position to said depressed position while said shutter drive member is blocked against movement from said first position to said second position, whereby said biasing means effects shutter operating movement of said shutter drive member from said first position to said second position in response to movement of said control member from said second location to said first location by said metering member.

6. A camera according to claim 5 including shutter resetting means for moving said shutter drive member from said second position to said first position in response to movement of said trigger member from said depressed position to said extended position by said resilient means.

* * * * *